US012584822B2

(12) United States Patent

Taguchi et al.

(10) Patent No.: US 12,584,822 B2

(45) Date of Patent: Mar. 24, 2026

(54) ANOMALY DETECTION APPARATUS, METHOD, AND STORAGE MEDIUM

(71) Applicants: KABUSHIKI KAISHA TOSHIBA, Tokyo (JP); Toshiba Energy Systems & Solutions Corporation, Kawasaki Kanagawa (JP)

(72) Inventors: Yasunori Taguchi, Kawasaki Kanagawa (JP); Kouta Nakata, Tokyo (JP); Susumu Naito, Yokohama Kanagawa (JP); Yuichi Kato, Moriya Ibaraki (JP); Shinya Tominaga, Yokohama Kanagawa (JP); Naoyuki Takado, Tokyo (JP); Ryota Miyake, Yokohama Kanagawa (JP); Yusuke Terakado, Yokohama Kanagawa (JP); Toshio Aoki, Tokyo (JP)

(73) Assignees: KABUSHIKI KAISHA TOSHIBA, Kawasaki (JP); Toshiba Energy Systems & Solutions Corporation, Kawasaki (JP)

( * ) Notice: Subject to any disclaimer, the term of this patent is extended or adjusted under 35 U.S.C. 154(b) by 247 days.

(21) Appl. No.: 18/174,008

(22) Filed: Feb. 24, 2023

(65) Prior Publication Data

US 2024/0085278 A1     Mar. 14, 2024

(30) Foreign Application Priority Data

Sep. 14, 2022     (JP) ................................. 2022-146371

(51) Int. Cl.
*G06F 11/20* (2006.01)
*G01M 99/00* (2011.01)

(52) U.S. Cl.
CPC ................................. *G01M 99/005* (2013.01)

(58) Field of Classification Search
CPC ................................................. G01M 99/005
See application file for complete search history.

(56) References Cited

U.S. PATENT DOCUMENTS 11,526,783 B2   12/2022   Naito et al.
2021/0065023 A1*   3/2021   Naito ..................... G06N 3/045
(Continued)

FOREIGN PATENT DOCUMENTS

JP          2005-284405 A      10/2005
JP          2020-201683 A      12/2020
(Continued)

OTHER PUBLICATIONS

U.S. Appl. No. 17/942,976.
(Continued)

*Primary Examiner* — Phuong Huynh
(74) *Attorney, Agent, or Firm* — Finnegan, Henderson, Farabow, Garrett & Dunner, LLP

(57) ABSTRACT

According to one embodiment, an anomaly detection apparatus includes a processing circuit. The processing circuit is configured to: acquire measured values from sensors installed in a system, a first function, a first threshold, and a second function to output a second threshold; generate the predicted values based on the measured value and the first function; detect that a deviation between the measured values and the predicted values exceeds the first threshold; calculate the feature quantities based on the measured values; and determine whether a number of consecutive times is equal to or larger than the second threshold to detect an anomaly or a sign of the anomaly.

10 Claims, 11 Drawing Sheets

(56) References Cited

U.S. PATENT DOCUMENTS

2021/0356943 A1 * 11/2021 Taguchi ............. G05B 19/4183
2022/0137611 A1     5/2022 Naito et al.

FOREIGN PATENT DOCUMENTS

| | | | |
|---|---|---|---|
| JP | 2021-33705 | A | 3/2021 |
| JP | 2021-179740 | A | 11/2021 |
| JP | 2021-189717 | A | 12/2021 |
| JP | 2022-74890 | A | 5/2022 |
| JP | 2022074890 | * | 5/2022 |
| WO | WO 2022/104315 | A1 | 5/2022 |

OTHER PUBLICATIONS

U.S. Appl. No. 17/680,374.
Japan Patent Office, Office Action in JP App. No. 2022-146371,
(Aug. 19, 2025).

* cited by examiner

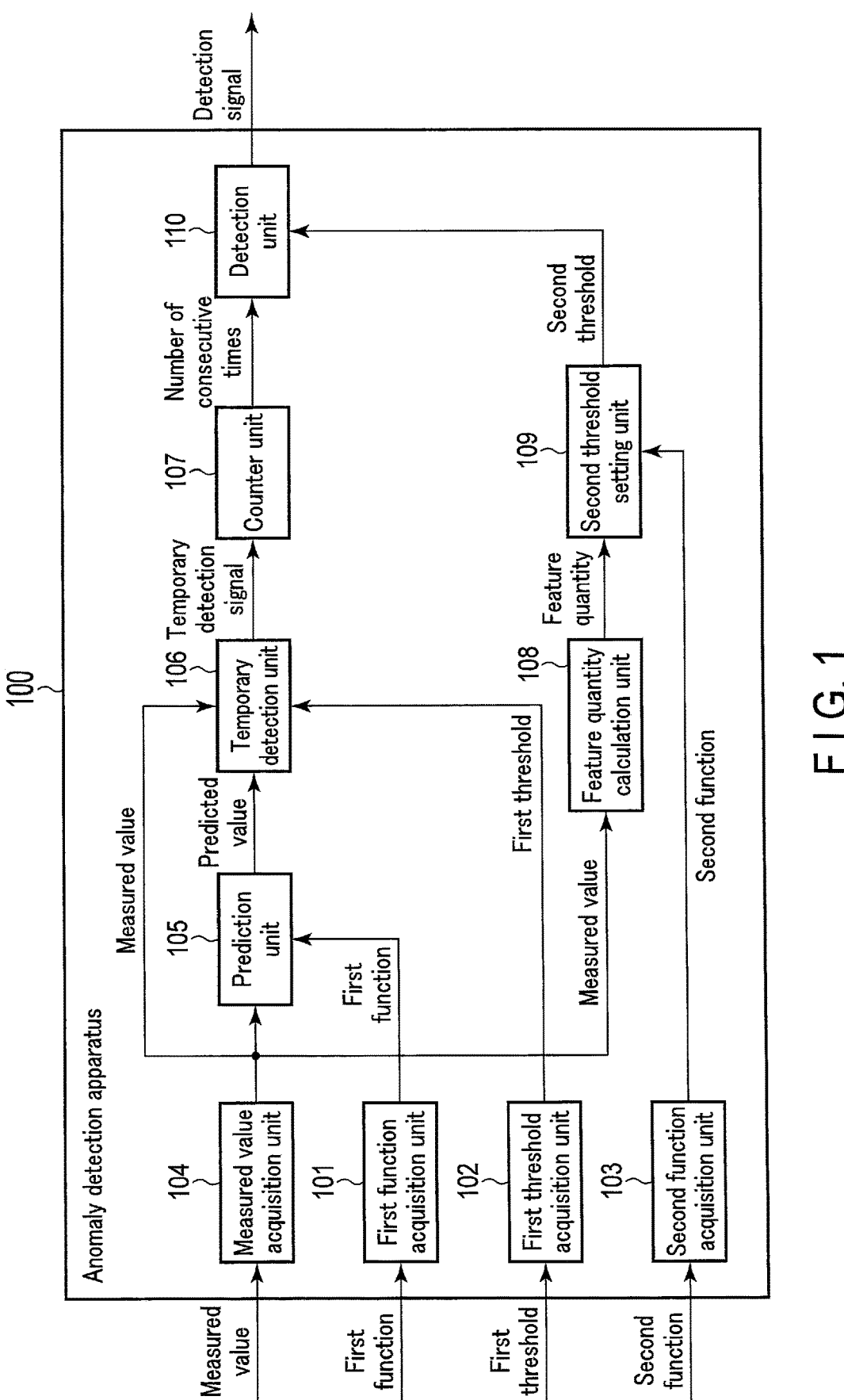
F I G. 1

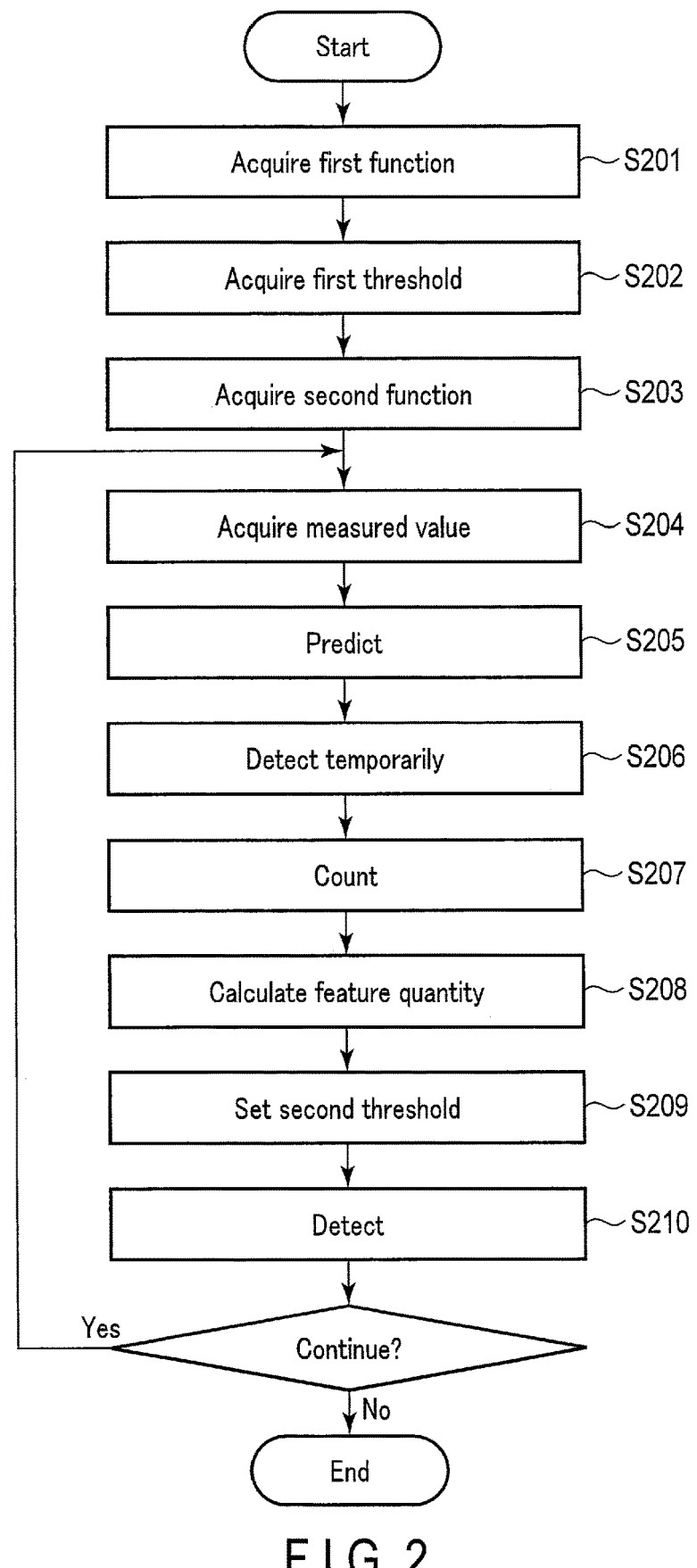
F I G. 2

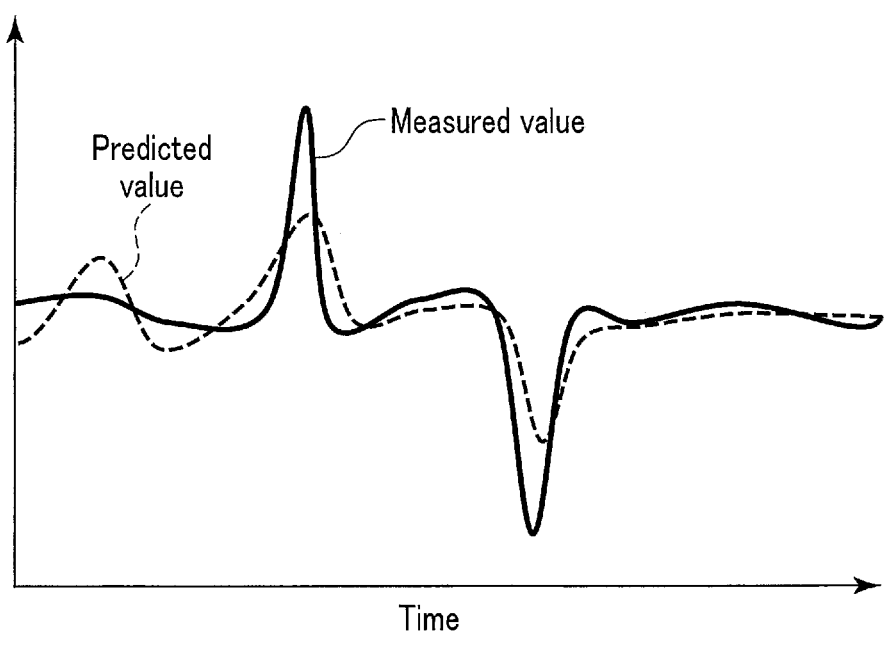
F I G. 3
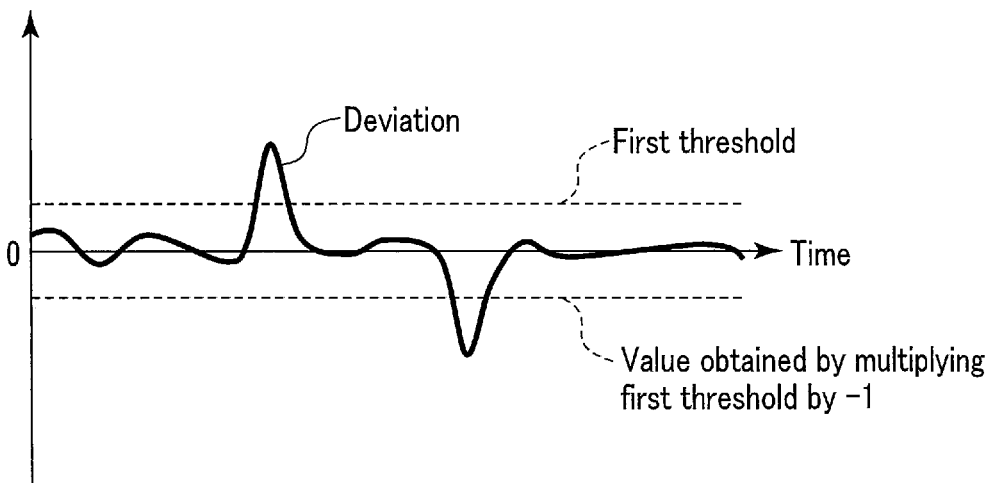
F I G. 4

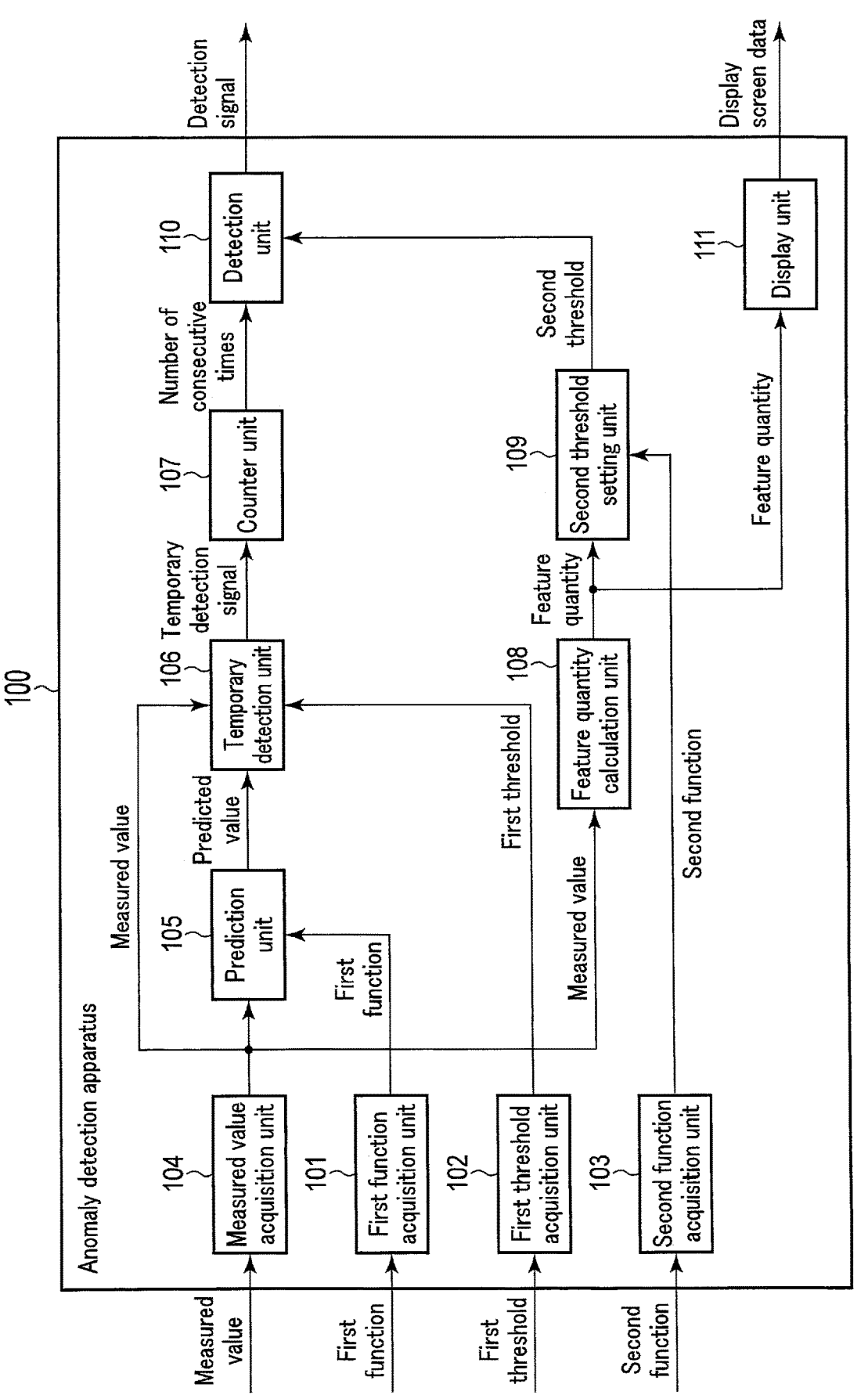
F I G. 5

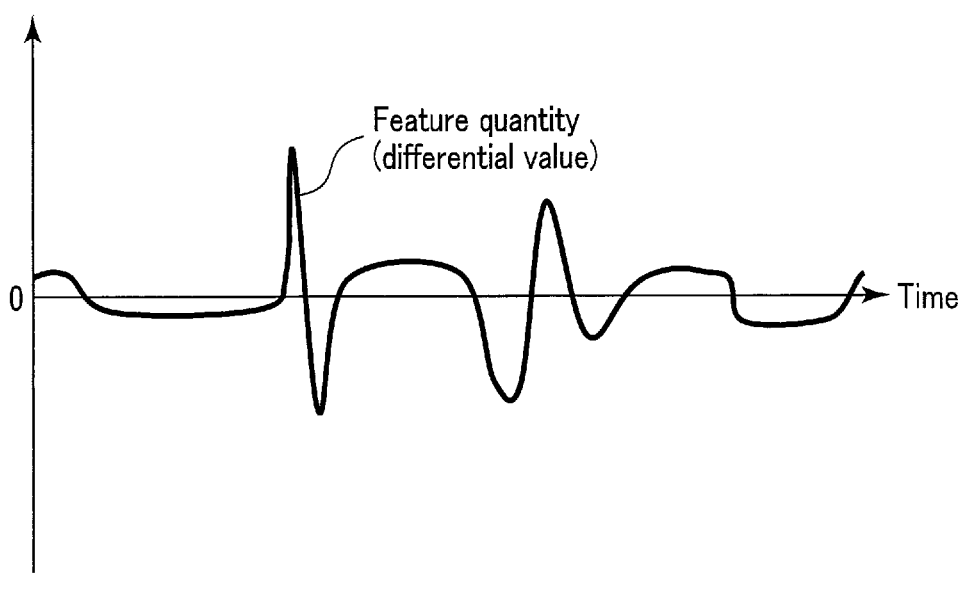
F I G. 6

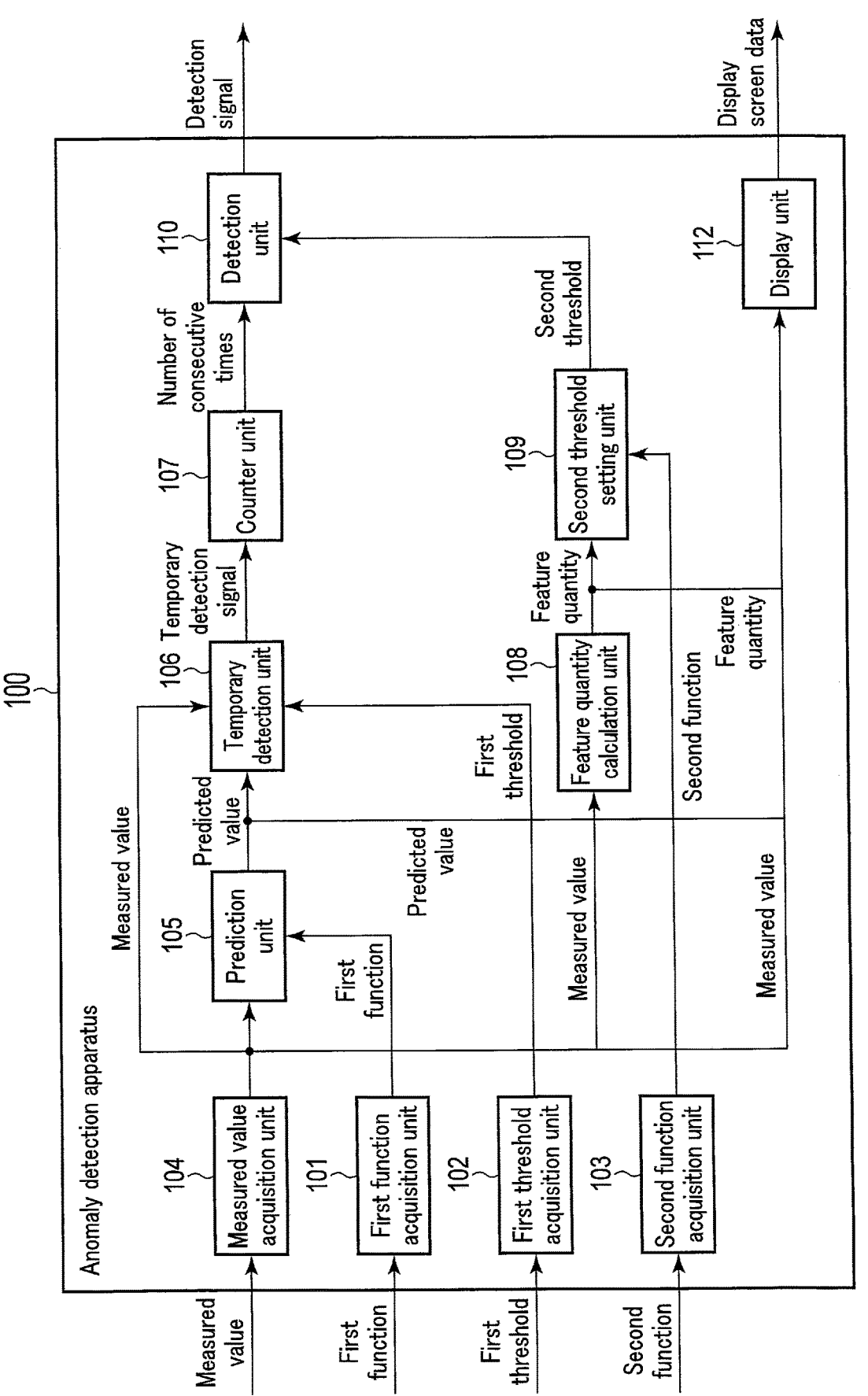
F I G. 7

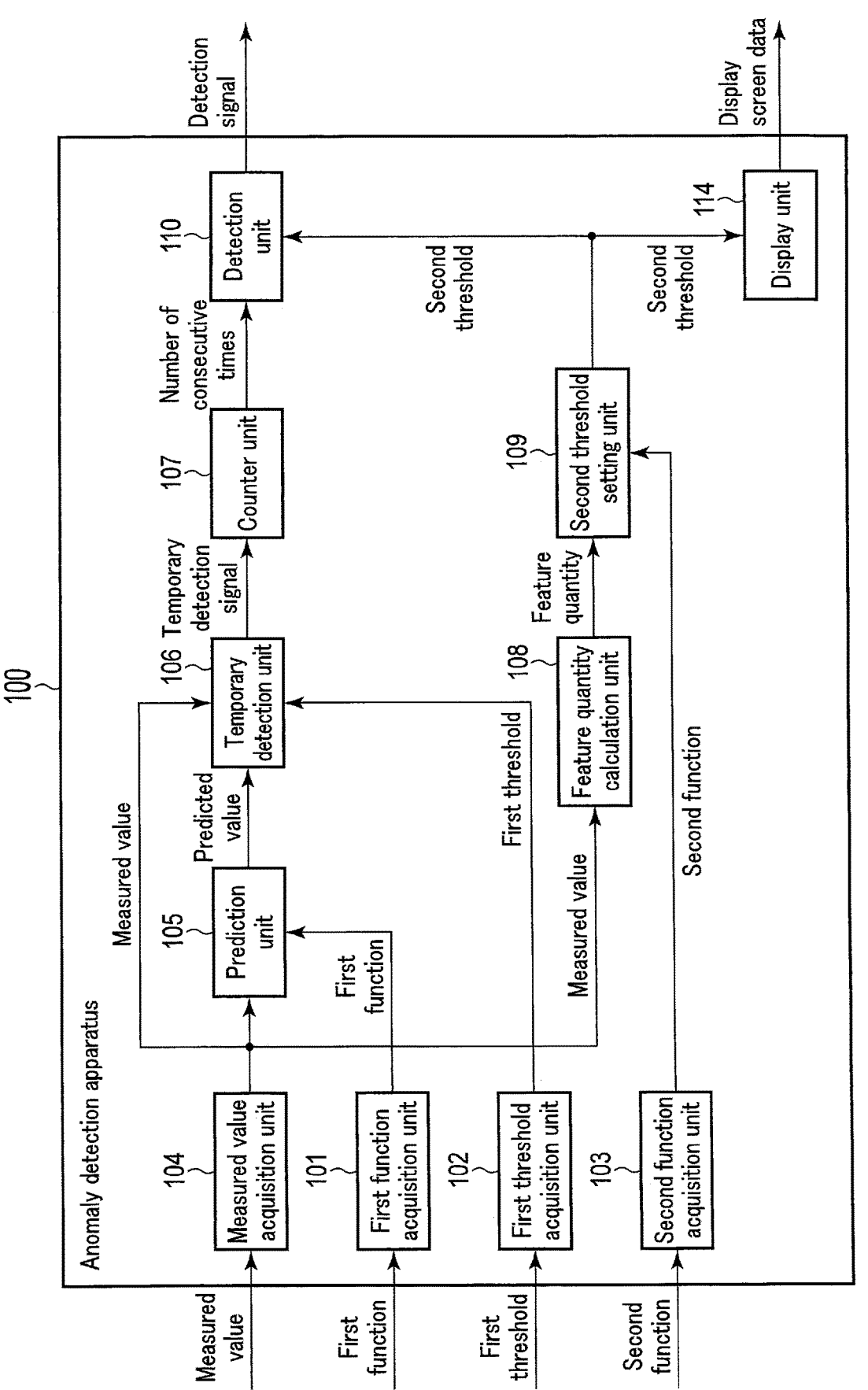
F I G. 11

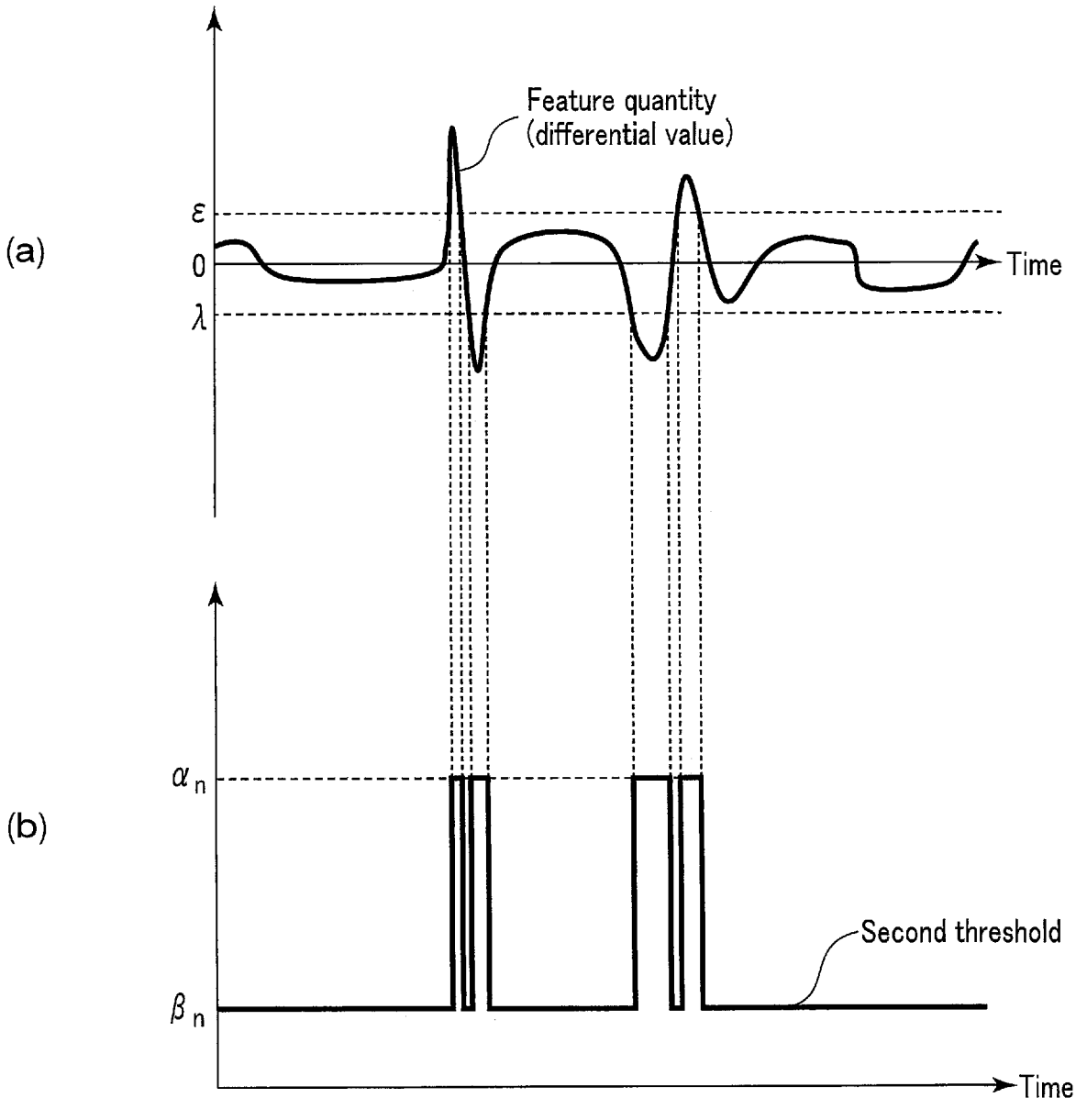
F I G. 12

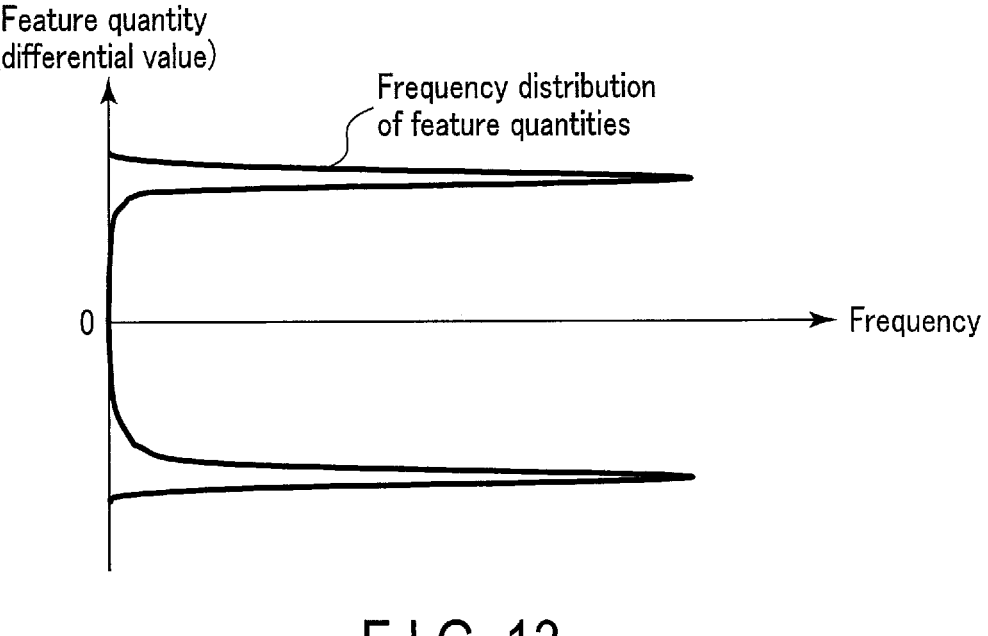
F I G. 13
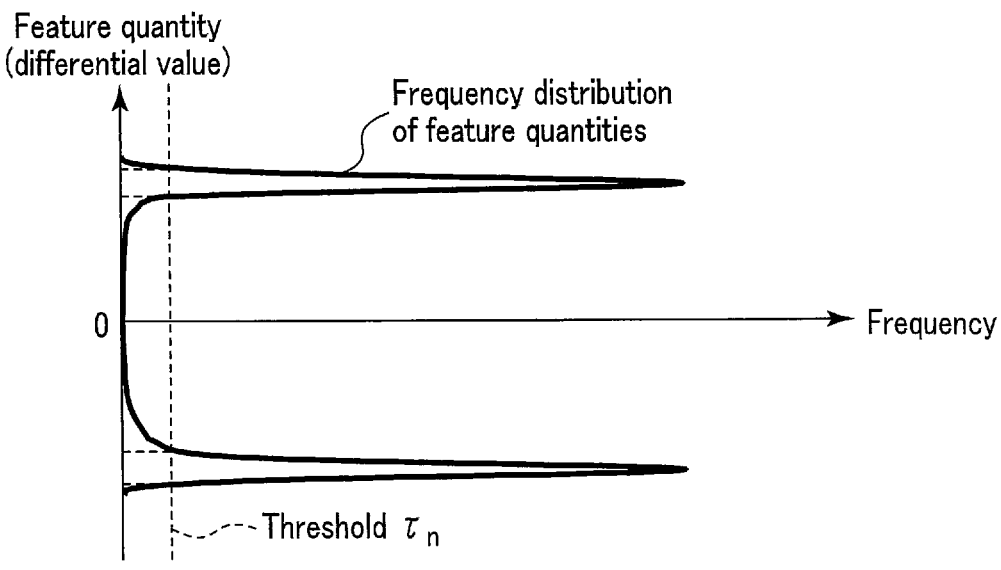
F I G. 14

ANOMALY DETECTION APPARATUS, METHOD, AND STORAGE MEDIUM

CROSS-REFERENCE TO RELATED APPLICATION(S)

This application is based upon and claims the benefit of priority from prior Japanese Patent Application No. 2022-146371, filed Sep. 14, 2022, the entire contents of which are incorporated herein by reference.

FIELD

Embodiments described herein relate generally to an anomaly detection apparatus, a method, and a storage medium.

BACKGROUND

Infrastructure systems for use in power plants and water treatment plants, and systems for use in manufacturing equipment, include a plurality of apparatuses. If an infrastructure system fail, it may adversely affect social functioning. If a system for manufacturing equipment also fails, it may cause economic loss. It is thus important to keep these systems healthy.

A system needs to be monitored to prevent the system from failing or to restore the system as quickly as possible if the system fails. To monitor the system, one or more sensors are often located throughout the system. Using values measured by the located sensors, the state of the system can be monitored. With larger or more complex systems, however, a number of sensors are required to monitor the sensors. In this case, it is difficult to monitor all of the sensors simultaneously with a limited number of people.

As an apparatus for resolving the above problems, an anomaly detection apparatus that assists or automates system monitoring is known. This anomaly detection apparatus employs, for example, a method of generating a predicted value using an approximate formula generated from the measured values of sensors obtained under normal conditions, and detecting an anomaly if the number of times the measured values consecutively deviate from the predicted value reaches a predetermined threshold. This method prevents erroneous detection in which normal system behavior is erroneously detected as anomaly.

To be noted here is, however, that there is a tradeoff relationship between early detection of anomaly and prevention of erroneous detection. If thresholds are uniformly set to small values for the number of consecutive times, regardless of sensors or time, anomalies can be detected early, but erroneous detection increases in number. Conversely, if thresholds are uniformly set to large values for the number of consecutive times, regardless of sensors or time, erroneous detection can be decreased in number, but anomalies cannot be detected early.

BRIEF DESCRIPTION OF THE DRAWING(S)

FIG. 1 is a diagram showing an example of a configuration of an anomaly detection apparatus according to a first embodiment.

FIG. 2 is a flowchart showing a procedure for an anomaly detection process to be performed by the anomaly detection apparatus according to the first embodiment.

FIG. 3 is a diagram showing an example of time variations of a predicted value caused by the anomaly detection apparatus according to the first embodiment.

FIG. 4 is a diagram showing an example of time variations of deviation caused by the anomaly detection device according to the first embodiment.

FIG. 5 is a diagram showing an example of a configuration of an anomaly detection apparatus according to a fourth modification.

FIG. 6 is a diagram showing an example of time variations of feature quantities caused by the anomaly detection apparatus according to the fourth modification.

FIG. 7 is a diagram showing an example of a configuration of an anomaly detection apparatus according to a fifth modification.

FIG. 11 is a diagram showing an example of a configuration of an anomaly detection apparatus according to a seventh modification.

FIG. 12 is a diagram showing an example of time variations of a second threshold caused by the anomaly detection apparatus according to the seventh modification.

FIG. 13 is a diagram showing an example of the frequency distribution of feature quantities for use in an anomaly detection apparatus according to a second embodiment.

FIG. 14 is a diagram showing an example of superposing a threshold on the frequency distribution in FIG. 13.

DETAILED DESCRIPTION

Figure 8:
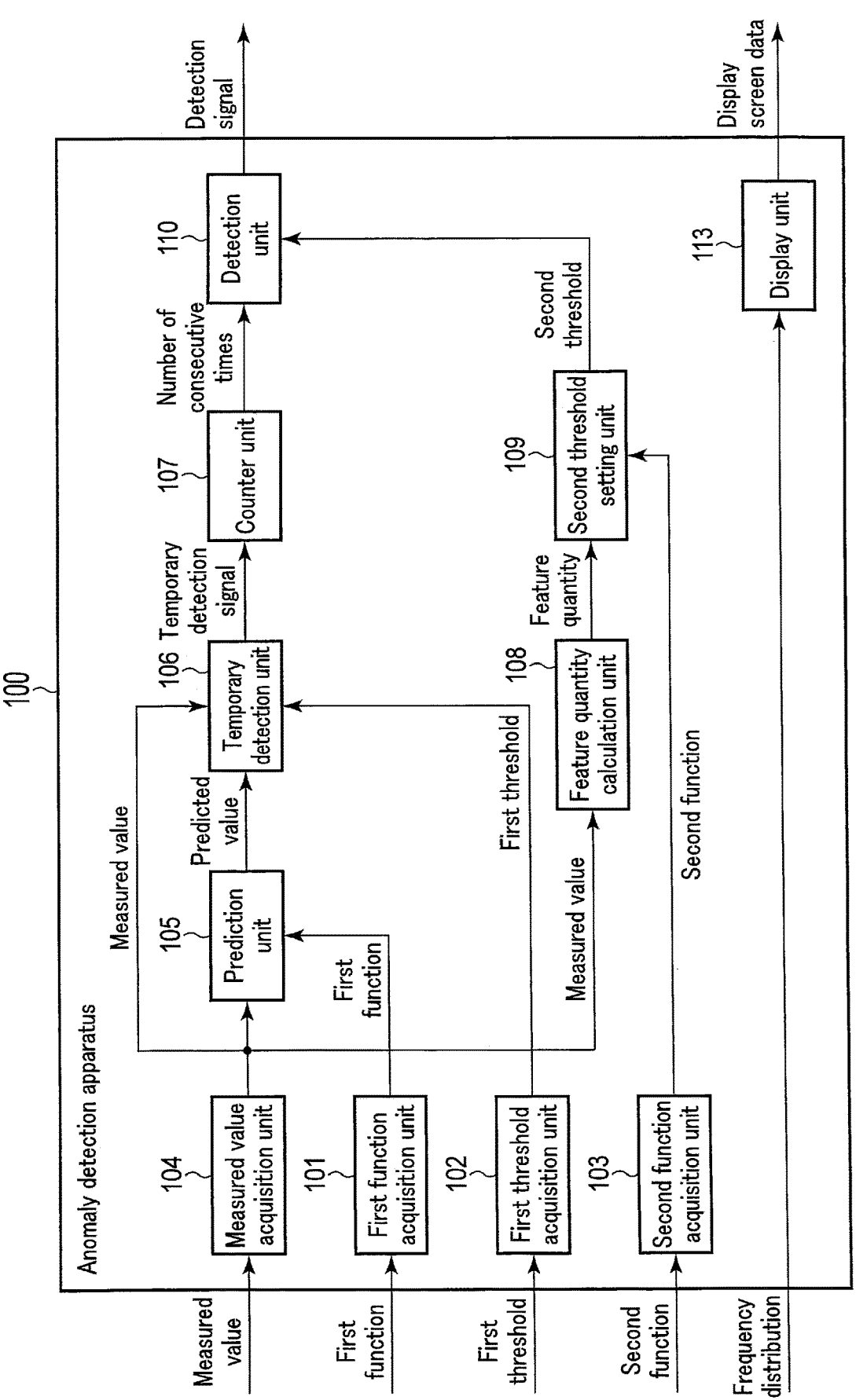
FIG. 8 is a diagram showing an example of a configuration of an anomaly detection apparatus according to a sixth modification.

In general, according to one embodiment, an anomaly detection apparatus includes a processing circuit. The processing circuit is configured to: acquire measured values from a plurality of sensors installed in a system to be monitored; acquire a first function to output predicted values of the measured values upon receipt of the measured values; acquire a first threshold; acquire a second function to output a second threshold upon receipt of feature quantities related to a change in the measured values over time; generate the predicted values based on a measured value acquired at a time for monitoring and the first function; temporarily detect that a deviation between the measured values and the predicted values exceeds the first threshold to generate a temporary detection signal related to a result of the temporary detection; count the number of consecutive times of the temporary detection at the time for monitoring based on the temporary detection signal; calculate the feature quantities based on the measured values; set a second threshold based on the feature quantities and the second function; and determine whether the number of consecutive times is equal to or larger than the second threshold to detect one of an anomaly of the system to be monitored and a sign of the anomaly and generate a detection signal related to a result of the detection.

Embodiments of an anomaly detection apparatus, a method and a storage medium will be described below in detail with reference to the accompanying drawings. In the following description, constituent elements having substantially the same function and configuration will be denoted by the same reference numeral or sign, and their overlapping description will be given only when necessary.

First Embodiment

FIG. 1 is a diagram showing a configuration of an anomaly detection apparatus 100 according to a first embodiment. The anomaly detection apparatus 100 is connected to a system to be monitored, via a network or the like. The anomaly detection apparatus 100 detects an anomaly of the system or a sign of the anomaly. Hereinafter, "a sign of the anomaly" will be described simply as "anomaly" without being distinguished from anomaly. The anomaly detection apparatus 100 acquires measured values obtained from time to time in a plurality of sensors installed in the system to be monitored, and detects an anomaly of the system. The anomaly detection apparatus 100 then outputs a signal indicating an anomaly detection result to an external device such as a display.

The network is, for example, a local area network (LAN). Note that the connection to the network may be made by wire or wirelessly. In addition, the network is not limited to a LAN but may be the Internet, a public communication line or the like.

The anomaly detection apparatus 100 includes a processing circuit that controls the anomaly detection apparatus 100 in its entirety and a storage medium (memory). The processing circuit is a processor that invokes a program in the storage medium to perform the functions of a first function acquisition unit 101, a first threshold acquisition unit 102, a measured value acquisition unit 104, a second function acquisition unit 103, a prediction unit 105, a temporary detection unit 106, a counter unit 107, a feature quantity calculation unit 108, a second threshold setting unit 109 and a detection unit 110. The processing circuit is formed of an integrated circuit including a central processing unit (CPU), an application specific integrated circuit (ASIC), a field programmable gate array (FPGA) or the like. The processor may be formed of one or more integrated circuits.

The storage medium stores processing programs used in the processor, parameters and tables used in arithmetic operation in the processor, and the like. The storage medium is a storage device, such as a hard disk drive (HDD), a solid state drive (SSD) and an integrated circuit, which stores various items of information. The storage device is not only the HDD and SSD, but also may be a portable storage medium, such as a compact disc (CD), a digital versatile disc (DVD) and a flash memory, and a drive device that reads and writes various items of information from and to a semiconductor memory device, such as a flash memory and a random access memory (RAM).

Note that the function of each of the units 101, 102, 103, 104, 105, 106, 107, 108, 109 and 110 may be fulfilled by a single processing circuit or each of independent processors which executes a program. The function of each of the units 101, 102, 103, 104, 105, 106, 107, 108, 109 and 110 may also be implemented as a separate hardware circuit.

The first function acquisition unit 101 acquires a first function and sends the acquired first function to the prediction unit 105. The first function is a function of outputting a predicted value to be described later upon receipt of a measured value to be described later from outside the anomaly detection apparatus 100. As the first function, for example, a function represented by a trained model generated by machine learning is used. Specifically, the first function is, for example, a machine learning model generated from history data of measured values of a plurality of sensors installed in a system to be monitored (hereafter referred to as sensors to be monitored). Various machine learning methods are known, such as linear regression, polynomial regression, ridge regression, kernel ridge regression, support vector regression, decision tree regression, random forest regression, and neural networks. The neural networks include auto-encoders and deep learning.

The first threshold acquisition unit 102 acquires a first threshold for the sensors to be monitored from outside the anomaly detection apparatus 100 and sends it to the temporary detection unit 106. The first threshold is a threshold for use in making temporary detection to be described later for a deviation between the measured value and the predicted value.

The second function acquisition unit 103 acquires a second function from outside the anomaly detection apparatus 100 and sends the acquired second function to the second threshold setting unit 109. The second function is a function of outputting a second threshold to be described later upon receipt of a feature quantity (described later) which is calculated based on the measured value.

The measured value acquisition unit 104 acquires measured values of the sensors, which are installed in the system to be monitored, from outside the anomaly detection apparatus 100. Specifically, the measured value acquisition unit 104 acquires information (hereafter referred to as measured value data) including a measured value of each of the sensors installed in the system to be monitored. The measured value data is time-series data measured from time to time by the sensors installed in the system to be monitored. The acquisition interval of the measured value data is preferably determined according to the sampling interval of the sensors and the processing speed of the anomaly detection apparatus 100. The acquisition interval of the measured value data is, for example, one minute, ten minutes or the like. A memory may be provided in the interior of the measured value acquisition unit 104 in order to handle the measured values at a plurality of hours near the time for monitoring.

The measured value acquisition unit 104 generates a vector having a measured value as an element and sends the generated vector to the prediction unit 105. This vector is used for prediction processing described later in the prediction unit 105. The measured value acquisition unit 104 also generates a vector having a measured value as an element and sends the generated vector to the temporary detection unit 106. This vector is used for temporary detection processing described later in the temporary detection unit 106. The measured value acquisition unit 104 also generates a vector having a measured value as an element and sends the generated vector to the feature quantity calculation unit 108. This vector is used to calculate a feature quantity described later in the feature quantity calculation unit 108.

The prediction unit 105 generates a predicted value based on the measured value and the first function. Specifically, the prediction unit 105 acquires a predicted value of each of the sensors, which is output from the first function acquired from the first function acquisition unit 101, from the measured value acquisition unit 104 at the time for monitoring in the sensor. The prediction unit 105 sends the generated predicted value to the temporary detection unit 106.

The temporary detection unit 106 temporarily detects that a deviation between the measured value and the predicted value exceeds a first threshold to generate a temporary detection signal related to a result of the temporary detection. The temporary detection is a temporary detection of whether a measured value is a candidate for an anomaly before the final anomaly detection is performed. The temporary detection unit 106 calculates a deviation between the measured and predicted values for each sensor using the vector of a measured value acquired from the measured value acquisition unit 104 and a predicted value acquired from the prediction unit 105, and determines whether the measured value is a candidate for anomaly for each of the sensors to be monitored, based on the calculated deviation and the first threshold acquired from the first threshold acquisition unit 102. When the temporary detection unit 106 determines that the measured value is a candidate for anomaly, it generates a signal indicating that the measured value is a candidate for anomaly (hereafter referred to as a temporary detection signal), and sends the generated temporary detection signal to the counter unit 107.

The counter unit 107 counts the number of consecutive temporary detections at the time for monitoring based on the temporary detection signal. Specifically, the counter unit 107 stores the temporary detection signal acquired from the temporary detection unit 106 over time and calculates the number of times the measured value continues to be determined as a candidate of anomaly until the time for monitoring. Then, the counter unit 107 sends the calculated number of times to the detection unit 110 as a continuous number.

On the basis of the measured value, the feature quantity calculation unit 108 calculates a feature quantity regarding a change in the measured value over time. Specifically, the feature quantity calculation unit 108 calculates, for each of the sensors, a feature quantity regarding a change in the measured value over time, based on the measured value of each of the sensors acquired from the measured value acquisition unit 104. As the feature quantity, for example, a differential value of the measured value, an absolute value of the differential value of the measured value, a cumulative value of the differential value of the measured value, or a cumulative value of the absolute value of the differential value of the measured value can be used. The feature quantity calculation unit 108 sends the calculated feature quantity to the second threshold setting unit 109.

The second threshold setting unit 109 sets a second threshold based on the feature quantity and the second function. Specifically, the second threshold setting unit 109 sets a second threshold for each of the sensors based on the second function acquired from the second function acquisition unit 103 and the feature quantity acquired from the feature quantity calculation unit 108. The second threshold setting unit 109 sends the second threshold set for each of the sensors to the detection unit 110.

The second function is a function in which the second threshold is set large for patterns in which data of normal patterns cannot sufficiently be prepared as training data for use in learning a trained model used as the first function. Based on the frequency distribution of the feature quantity calculated based on the training data, which is a set of measured values used for training of the trained model, the second function outputs a first value as the second threshold upon receiving a feature quantity with a first frequency, and outputs a second value equal to or greater than the first value as the second threshold upon receiving a feature quantity with a second frequency less than the first frequency. In addition, the second threshold output from the second function is designed to take two or more different values depending on the frequency in the frequency distribution of feature quantities, which is input to the second function.

In most cases, steady operation dominates in plants such as power plants and water treatment plants and in systems to be monitored which are used for manufacturing equipment. In this case, the number of times when the measured value changes over time is small. Thus, the second function for this case should be designed as a function in which the second threshold is set large when the measured value changes greatly. A great change in measured value over time corresponds to a large feature quantity or its absolute value. Since it is known that as the feature quantity or its absolute value increases, the frequency in training data becomes lower, a function is used to take advantage of this fact and to output a larger value as a second threshold when the input feature quantity or its absolute value is small as a second function. In this case, the second function outputs a first value as the second threshold upon receiving a first feature quantity, and outputs a second value that is equal to or greater than the first value as the second threshold upon receiving a second feature quantity that is larger than the first feature quantity or upon receiving a second feature quantity whose absolute value is larger than that of the first feature quantity. Accordingly, the second threshold setting unit 109 sets a larger value as the second threshold as the feature quantity acquired from the feature quantity calculation unit 108 or its absolute value becomes smaller.

Note that the second function may be two different functions that output a large value if the input feature quantity is smaller than a predetermined threshold and output a small value if the input feature quantity is equal to or larger than the predetermined threshold or may be a function that outputs three or more different values in accordance with the input feature quantity.

The detection unit 110 generates a detection signal for a sensor to be monitored from the number of consecutive times acquired from the counter unit 107 and the second threshold acquired from the second threshold setting unit 109, and outputs the generated detection signal to the outside of the anomaly detection apparatus 100. For example, the detection unit 110 determines whether the number of consecutive times is equal to or larger than the second threshold to detect an anomaly in the system to be monitored and generate a detection signal related to a result of the detection.

Next is a description of an anomaly detection process to be performed by the anomaly detection apparatus 100. FIG. 2 is a flowchart showing an example of a procedure for the anomaly detection process. The anomaly detection process is a process to detect an anomaly of a system based on sensor values obtained from the sensors installed in the system to be monitored. The procedure in each process to be described below is only one example, and the process can be modified as appropriate as possible. As for the procedure to be described below, steps can be deleted, replaced and added as appropriate according to the embodiments.

Note that the process from step S201 to step S203 is performed in advance before an anomaly is detected at the time for monitoring. On the other hand, the process from step S204 to step S211 is a process to detect an anomaly at the time for monitoring. The process from step S204 to step S211 is performed at predetermined time intervals, for example. The time intervals will be referred to as sampling intervals hereinafter because they also intervals at which measured values are acquired. The sampling intervals are often set to time intervals to such a degree that the measured value of each sensor to be monitored does not change excessively and rapidly in the trend graph of the measured value to easily grasp the trend of measured values of a number of sensors to be monitored sensors among N sensors to be monitored. The time for monitoring time and the synchronization of respective units are controlled by the processing circuit.

(Anomaly Detection Process)

(Step S201)

Upon receiving a measured value to be described later from outside the anomaly detection apparatus 100, the first function acquisition unit 101 acquires a first function that outputs a predicted value to be described later, and sends it to the prediction unit 105. Here, the first function is represented by f. The first function f is, for example, a machine learning model generated from history data of measured values of a plurality of sensors installed in a system to be monitored. To train the machine learning model f, for example, training data including a set of x and y described later is generated from the history data, and the machine learning model f is learnt from the training data so that the sum E of squared errors of f(x) for y is minimized. The sum E of squared errors is calculated using the following equation (1):

$$E = \sum_{i=1}^{D} \|f(x_i) - y_i\|^2 \qquad (1)$$

In the equation (1), $\|\cdot\|$ represents the L2 norm of a vector, D represents the number of sets of x and y included in the training data, and subscripts i of x and y represent the number of the set, where i=1, 2, . . . , D.

(Step S202)

The first threshold acquisition unit 102 acquires a first threshold for N sensors to be monitored from outside the anomaly detection apparatus 100 and sends it to the temporary detection unit 106. The first threshold for each of the sensors to be monitored is represented by an N-dimensional vector j. Also, the n-th (n=1, 2, . . . , N) element of the vector j is represented by $j_n$. The element $j_n$ represents a first threshold for the n-th sensor to be monitored.

(Step S203)

Upon receiving a feature quantity from outside the anomaly detection apparatus 100, the second function acquisition unit 103 acquires a second function that outputs a second threshold, and sends it to the second threshold setting unit 109. Here, the second function is represented by g. The second function g is a function to generate a second threshold k to be described later. The second function g is, for example, a vector value function that satisfies the following equation (2):

$$k=(k_1,k_2, \ldots ,k_N)^T=g(v)=(g_1(v),g_2(v), \ldots ,g_N(v))^T \qquad (2)$$

In the equation (2), T represents transposition of matrices and vectors. Function $g_n$ is a function that outputs a second threshold $k_n$ (n=1, 2, . . . , N) upon receipt of a feature quantity v. The second threshold $k_n$, feature quantity v, and function $g_n$ will be described later.

(Step S204)

The measured value acquisition unit 104 acquires measured values of the sensors installed in the system to be monitored from outside the anomaly detection apparatus 100. Then, the measured value acquisition unit 104 sends to the prediction unit 105 a vector x having as an element each measured value necessary for the prediction process described later in the prediction unit 105. The measured value acquisition unit 104 also sends to the temporary detection unit 106 a vector y having as an element each measured value necessary for the temporary detection process described later in the temporary detection unit 106. In addition, the measured value acquisition unit 104 sends to the feature quantity calculation unit 108 a vector z having as an element each measured value necessary for the calculation of a feature quantity described later in the feature quantity calculation unit 108. In order to handle the measured values at a plurality of hours near the time for monitoring, a memory may be provided in the interior of the measured value acquisition unit 104.

As for the measured values to be referred to in the prediction process in the prediction unit 105, the number of sensors will be represented by M, and the time length prior to the reference time will be represented by W. In this case, the number of dimensions of the vector x is MW. The time window of the vector x may or may not include the time for monitoring.

The vector y is an N-dimensional vector having as elements the measured values of N sensors to be monitored at the time for monitoring. The n-th (n=1, 2, . . . , N) element of the vector y will be represented by $y_n$. The element $y_n$ represents the measured value of the n-th sensor to be monitored at the time for monitoring.

The vector z is an NU-dimensional vector having as elements the measured values of N sensors to be monitored near the time for monitoring. Here, U represents the length of the time window near the time for monitoring. The time window in the vector z includes the time for monitoring.

(Step S205)

From the first function f and the vector x of the measured value, the prediction unit 105 generates an N-dimensional vector f(x) having as elements the predicted values of measured values of N sensors to be monitored at the time for monitoring. The n-th (n=1, 2, . . . , N) element of the vector f(x) will be represented by $f_n$. The element $f_n$ represents the predicted value of the n-th sensor to be monitored at the time for monitoring. The prediction unit 105 sends the vector f(x) of the predicted value to the temporary detection unit 106.

(Step S206)

Based on the vector y of the measured value, the vector f(x) of the predicted value, and the first threshold j, the temporary detection unit 106 generates a temporary detection signal indicating whether the measured value is a candidate for anomaly for each of the N sensors to be monitored, and sends the temporary detection signal to the counter unit 107. The temporary detection signal will be represented by an N-dimensional vector c. The n-th (n=1, 2, . . . , N) element of the vector c will be represented by $c_n$. The element $c_n$ represents a temporary detection signal of the n-th sensor to be monitored. The element $c_n$ is calculated by, for example, the following equation (3):

$$c_n = \begin{cases} 0 & |y_n - f_n| \le j_n \\ 1 & \text{otherwise} \end{cases} \qquad (3)$$

(Step S207)

Based on the vector c of the temporary detection signal, the counter unit 107 counts the number of consecutive temporary detections of each of the N sensors to be monitored, and sends it to the detection unit 110. The number of consecutive temporary detections is the number of times temporary detections are performed consecutively until the time for monitoring. The number of consecutive temporary detections of the N sensors to be monitored is represented by an N-dimensional vector r. The n-th (n=1, 2, . . . , N) element of the vector r is represented by $r_n$. The element $r_n$ represents the number of consecutive temporary detections of the n-th sensor to be monitored. If $c_n$ is 0 at the time for monitoring, $r_n$ is also 0. If $c_n$ is 1 at the time for monitoring, $r_n$ is the result of counting how many consecutive times $c_n$ was 1 retroactively from the time for monitoring. To count the number of consecutive temporary detections, history data of the vector c of the temporary detection signal is required. A memory may be provided in the interior of the counter unit 107 in order to retain the history data.
(Step S208)

From the vector z of the measured value, the feature quantity calculation unit 108 calculates a feature quantity indicating a change in time direction of the measured values of the N sensors to be monitored, and sends it to the second threshold setting unit 109. The feature quantity of the N sensors to be monitored is represented by vector v.
(Step S209)

The second threshold setting unit 109 sets second threshold for the N sensors to be monitored from the second function g and the vector v of the feature quantity, and sends them to the detection unit 110. Here, the second threshold for the N sensors to be monitored is represented by an N-dimensional vector k. The n-th ($n=1, 2, \ldots, N$) element of the vector k is represented by $k_n$. The element $k_n$ represents the second threshold for the n-th sensor to be monitored. The vector k is calculated by equation k=g (v).
(Step S210)

The detection unit 110 generates a detection signal for the N sensors to be monitored from the vector r of the number of consecutive times and the vector k of the second threshold, and outputs it to the outside of the anomaly detection apparatus 100. The detection signal for the N sensors to be monitored is represented by an N-dimensional vector d. The n-th ($n=1, 2, \ldots, N$) element of the vector d is represented by $d_n$. The element $d_n$ represents a detection signal for the n-th sensor to be monitored. The detection signal $d_n$ is calculated using, for example, the following equation (4):

$$d_n = \begin{cases} 0 & r_n \le k_n \\ 1 & \text{otherwise} \end{cases} \tag{4}$$

In the equation (4), the fact that $d_n=1$ indicates that the n-th sensor to be monitored is detected as an anomaly. The fact that $d_n$ is 0 indicates that the n-th sensor to be monitored is not detected as an anomaly.
(Step S211)

The anomaly detection apparatus 100 determines whether to continue the anomaly detection process. For example, when a system to be monitored is inspected or repaired or the anomaly detection apparatus 100 is maintained, the anomaly detection apparatus 100 determines that the anomaly detection process is not continued. If the anomaly detection process is continued (Yes in step S211), the process returns to step S204, and the process from step S204 to step S211 is repeated. If it is not continued (No in step S211), the anomaly detection process is terminated.

In the anomaly detection process, the vector d of detection signals is generated at each time for monitoring. That is, an anomaly of each sensor to be monitored is detected at each time for monitoring.
(Specific Examples of Feature Quantity)

Below is a detailed description of specific examples of feature quantity v.

The feature quantity v is calculated in order to specify when the measured value is drastically changed over time. The feature quantity v is, for example, N concatenated vectors a. ($n=1, 2, \ldots, N$).

The vectors an are calculated using, for example, a U-dimensional vector from which an element of the measured value of the n-th sensor to be monitored, among the vectors z of the measured value, are extracted. The vectors an are calculated, for example, by differentiating the U-dimensional vector. If the differential step is 1, $a_n$ is a (U−1)-dimensional vector, and the vector v of N concatenated vectors $a_n$ is an N(U−1)-dimensional vector. If the differential step is (U−1), $a_n$ is a one-dimensional vector, i.e., a scalar, and the vector v of N concatenated vectors $a_n$ is an N-dimensional vector. The differential step may be a value other than 1 and U−1. In this case, too, the vector v of N concatenated vectors $a_n$ corresponds to a feature quantity representing a change in measured value over time.

The vectors $a_n$ may be calculated using the absolute value of a differential value of the foregoing U-dimensional vector. In this case, too, the vector v of N concatenated vectors $a_n$ corresponds to a feature quantity representing a change in measured value over time.

In addition, $a_n$ may also represent a scalar obtained by accumulating the differential value and its absolute value in time direction. In this case, too, the vector v of N concatenated vectors $a_n$ corresponds to a feature quantity representing a change in measured value over time. In addition, $a_n$ is easily calculated if the vector x of a measured value input to the first function f is referred to. It is therefore preferable that a time period for accumulating differential values and their absolute values in time direction is equal to or shorter than the time window length of the vector x of the measured value input to the first function f.

The vector v may be the L1 norm of N concatenated vectors $a_n$. In this case, the feature quantity v is a scalar. In this case, too, the vector v corresponds to a feature quantity representing a change in measured value over time.
(Specific Examples of Second Function)

Next is a detailed description of specific examples of the second function g.

The second function g is a function for determining a second threshold from the feature quantity. If v is a vector, a function $g_n$ for determining g is calculated using, for example, the following equation (5):

$$g_n(v) = \frac{b_n}{\|v\|_1 + \varepsilon_n} \tag{5}$$

In the equation (5), $\|\cdot\|_1$ represents the L1 norm of the vector, $b_n$ is a positive constant, and $\varepsilon_n$ is a positive constant. The role of the constant $\varepsilon_n$ is to prevent the output value of the function $g_n$ from diverging. In this function $g_n$, as the L1 norm $\|v\|_1$ of the vector v decreases, a larger value is output. Since $k_n$ is equal to $g_n(v)$, as the L1 norm $\|v\|_1$ of the vector v, the value of the second threshold $k_n$ of the n-th sensor to be monitored becomes larger.

If the differential step for calculating $a_n$ is 1, then $a_n$ is a (U−1)-dimensional vector and v is an N(U−1)-dimensional vector. In this case, the following equation (6) holds, where $\|a_n\|_1$ represents the cumulative value of the absolute values of values differentiated in differential step 1 for the n-th sensor to be monitored.

$$\|v\|_1 = \sum_{n=1}^{N} \|a_n\|_1 \tag{6}$$

It is seen from $k_n = g_n(v)$ and the equations (5) and (6) that if the differential step is 1, $k_n$ becomes larger as the cumulative sum $\|v\|_1$ of the absolute values of the differential values decreases.

If the differential step for calculating $a_n$ is (U−1), $a_n$ is a one-dimensional vector, namely, a scalar. In this case, the equation "$\|a_n\|_1 = |a_n|$" holds, $\|a_n\|_1$ represents the absolute value of a differential value obtained by differentiating the n-th sensor to be monitored in the differential step U−1, and the following equation (7) holds.

$$\|v\|_1 = \sum_{n=1}^{N} |a_n| \qquad (7)$$

In the Equation (7), $|\cdot|$ represents the absolute value of the scalar. It is seen from $k_n = g_n(v)$ and the equations (5) and (7) that if the differential step is (U−1), $k_n$ becomes larger as the cumulative sum $\|v\|_1$ of the absolute values of the differential values decreases.

Though $v$ and $\|v\|_1$ are changed, they are both a feature quantity representing a change of a sensor to be monitored over time. Therefore, in the case of this function $g_n$, regardless of the differential step, $k_n$ takes a larger value as the change of the sensor to be monitored over time decreases. Thus, the second threshold at a time when the measured value of a sensor to be monitored changes rapidly is automatically controlled such that the second threshold becomes larger than a second threshold at another time.

As described above, other different functions may be used as the second function. However, there are restrictions on the second function. Specifically, the second function needs to be a function in which the second threshold is set large for a pattern that is incapable of adequately preparing data of a normal pattern as training data for use in learning of the trained model used as the first function. In plants such as a power plant and a water treatment plant and in systems to be monitored used for manufacturing equipment, steady operation is dominant. The second function thus needs to be a function in which the second threshold is set large when the measured value changes frequently over time. That is, based on the frequency distribution of feature quantities calculated based on training data, which is a set of measured values used to train the trained model, the second function outputs a first value as a second threshold upon receipt of a feature quantity having a first frequency, and outputs a second value equal to or greater than the first value as a second threshold upon receipt of a feature quantity having a second frequency that is lower than the first frequency. In addition, the second threshold is designed to take two different values according to the frequency in the frequency distribution of the feature quantities, which are input to the second function.

Advantageous Effect of First Embodiment

Below is a description of advantageous effects of the anomaly detection apparatus 100 according to the first embodiment.

(Principle of Generation of Mis-Detection)

First is a description of the principle of generation of mis-detection that can be suppressed in the first embodiment.

The inventors have discovered that there are a specific generation pattern and a principle of generation of the generation pattern in mis-detection. In short, the inventors have discovered a principle of generation of mis-detection.

FIGS. 3 and 4 are graphs illustrating a specific generation pattern of mis-detection. More specifically, FIG. 3 is a trend graph of the measured value $y_n$ and predicted value $f_n$ of the n-th sensor to be monitored. In FIG. 3, the horizontal axis represents time and the vertical axis represents the measured and predicted values. In FIG. 3, the solid line represents the measured value $y_n$ that changes over time and the broken line represents the predicted value $f_n$ that changes over time. FIG. 3 shows the measured value $y_n$ that changes over time when it fluctuates up and down as normal behavior. FIG. 4 is a trend graph showing a deviation $(y_n - f_n)$ between the measured and predicted values $y_n$ and $f_n$ of a sensor to be monitored. In FIG. 4, the horizontal axis represents time that is synchronized that in FIG. 3 and the vertical axis represents the deviation. In FIG. 4, the solid line represents a change in the deviation $(y_n - f_n)$ over time, the upper broken line represents a first threshold $j_n$, and the lower broken line represents a value that is obtained by multiplying the first threshold $j_n$ by −1.

As described above, FIG. 3 shows normal behavior of the measured value $y_n$. If, therefore, a_n anomaly is detected when the deviation in FIG. 4 exceeds the first threshold, the detection is mis-detection. It is seen from FIGS. 3 and 4 that a period of time during which the deviation in FIG. 4 exceeds the first threshold is synchronized with a period of time during which a change in the measured value over time in FIG. 3 is relatively large. It is thus understood that there is a generation pattern in which mis-detection is easily caused during a period of time during which a change in the measured value over time is relatively large.

It is seen from FIGS. 3 and 4 that a change in the predicted value in FIG. 3 does not follow the change in the measured value during the period of time during which the deviation in FIG. 4 exceeds the first threshold. It is thus understood that there is a generation pattern in which mis-detection is easily caused during the period of time during which the predicted value does not follow the measured value.

As described above, the first function f is learned, for example, by minimizing the sum E of squared errors. Therefore, the squared error $(=\|f(x_l) - y_l\|^2)$ of the predicted value $f(x_l)$ for input $x_l$ that occurs infrequently in training data used for learning the first function f is larger than the squared error $(=\|f(x_h) - y_h\|^2)$ of the predicted value $f(x_h)$ for input $x_h$ that occurs frequently in the training data, where "l" in input $x_l$ and "h" in input $x_h$ each represent an index.

As described above, the sampling interval of a sensor to be monitored is often set to such a degree that the measured value of the sensor does not change rapidly in the trend graph of measured values of a number of sensors to be monitored among the N sensors. Since, therefore, the history data includes a number of sensors whose measured values do not change rapidly, training data is created from the history data. Accordingly, the training data includes a number of sensors to be monitored, the measured values of which do not change rapidly. Therefore, the squared error $(=\|f(x_1) - y_1\|^2)$ of the predicted value $f(x)$ in the normal state of the system to be monitored tends to be large at times when the measured value of the sensor changes rapidly. This is because in FIG. 4, the predicted value $f_n$ does not follow the measured value $y_n$ at a time when the change of the measured value over time is relatively large, but the absolute value $(y_n - f_n)$ of the deviation becomes large. If the predicted value $f_n$ does not follow the measured value $y_n$ even though the system to be monitored is normal, the deviation of the measured value from the predicted value becomes large for each of the sensors to be monitored. Thus, the absolute value of the deviation tends to exceed the first threshold, which makes temporal detection easy and accordingly causes mis-detection easily. This is the principle of generation of mis-detection that have been discovered by the inventors of the present invention.

Since steady operation dominates in plants such as power plants and water treatment plants and in systems to be monitored which are used for manufacturing equipment, the measured values of most of the systems do not change so greatly over time. Accordingly, the occurrence frequency of measured values that change rapidly becomes low in the training data for use in learning of the trained model used as the first function. In other words, data of measure values that change rapidly cannot be prepared adequately as normal pattern data. It is thus understood that during a period of time during which the measured value changes relatively greatly over time, a predicted value output from the trained model does not easily follow the measured value and thus mis-detection occurs easily. The anomaly detection apparatus 100 of the first embodiment uses this fact to suppress mis-detection.

Configuration and Advantageous Effects of First Embodiment

The anomaly detection apparatus 100 of the first embodiment acquires measured values of a plurality of sensors installed in a system to be monitored, a first function, and a second function. The first function is a function that outputs a predicted value of the measured value upon receipt of the measured value, such as a function represented by a trained model generated by machine learning. The second function is a function that outputs a second threshold upon receipt of a feature quantity related to a change in the measured value over time. The feature quantity is, for example, a differential value of the measured value, an absolute value of the differential value, a cumulative value of the differential value, and a cumulative value of the absolute value of the differential value. The anomaly detection apparatus 100 generates a predicted value based on the measured value and the first function, temporarily detects that a deviation between the measured and predicted values exceeds a first threshold, and generates a temporary detection signal related to a result of the temporary detection. In response to the temporary detection signal, the anomaly detection apparatus 100 counts the number of consecutive temporary detections at a time for monitoring. The anomaly detection apparatus 100 calculates a feature quantity based on the measured value and sets the second threshold based on the feature quantity and the second function. The second function is designed to output a first value as the second threshold upon receipt of a feature quantity having a first frequency based on the frequency distribution of feature quantities calculated based on training data that is a set of measured values used in training of the trained model, output a second value, which is equal to or larger than the first value, as the second threshold upon receipt of a feature quantity having a second frequency that is lower than the first frequency, and output two or more different values, which correspond to feature quantities, as the second threshold. Then, the anomaly detection apparatus 100 determines whether the number of consecutive temporary detections is equal to or greater than the second threshold to detect an anomaly of the system to be monitored system or a sign of the anomaly and generate a detection signal related to a result of the detection.

In the prior art, a second threshold related to the number of consecutive temporary detections is set uniformly regardless of time or sensors. If the second threshold is set uniformly to a large value, a mis-detection signal is suppressed. Since, however, no anomaly is detected until the number of consecutive temporary detections exceeds the second threshold, anomaly detection timing is delayed. If, conversely, the second threshold is uniformly set to a small value, a delay in anomaly detection timing can be suppressed, but no mis-detection is suppressed.

In the first embodiment, the second threshold is set in accordance with a feature quantity representing a time-directional change in the measured values of N sensors to be monitored and a second function. A second threshold at a time when the measured value of a sensor to be monitored changes rapidly is automatically controlled to be larger than a second threshold at other times. This suppresses mis-detection at the time when the measured value of the sensor to be monitored changes rapidly. At the times when the measured value does not change rapidly, the second threshold does not become large; thus, anomaly detection timing is not delayed. Since the number of times when the measured values of a sensor to be monitored changes rapidly is relatively small, the possibility of delay in the anomaly detection timing can be minimized. The anomaly detection apparatus 100 of the first embodiment makes early detection of anomaly and suppression of mis-detection compatible with each other. If, therefore, a rare time change pattern is specified in training data, mis-detection can be suppressed.

It is also understood that mis-detection is easily caused because a rare time change pattern is specified in training data at times when a change in the measured value over time is relatively large, as described above. With the foregoing configuration, the anomaly detection apparatus 100 of the first embodiment specifies, by a feature quantity, a time when the measured value of a sensor to be monitored changes rapidly, and controls the second threshold automatically using the feature quantity and the second function such that the second threshold at the time becomes larger than that at other times. This increases the second threshold at a time when a change in the measured value over time is relatively large, makes it difficult to detect an anomaly at the time when a change in the measured value over time is relatively large, and thus suppresses mis-detection. That is, if the second threshold is increased during a period of time during which mis-detection is easily caused more than that during other periods of time.

If, furthermore, a cumulative value of differential values or a cumulative value of absolute values of differential values is used as a feature quantity, a cumulative period of the cumulative value is equal to or shorter than the time window length of a measured value input to the first function f. Since, in this case, the vector of the measured value input to the first function can be referred to in calculating the feature quantity, the anomaly detection apparatus 100 is easy to implement.

(First Modification)

In the first embodiment, it has been described that as given by the equation (2), the second threshold $k_n$ of the n-th sensor to be monitored depends on the vector v of the feature quantity. The vector v of the feature quantity is a vector obtained by concatenating N vectors $a_n$ (n=1, 2, . . . , N). The second threshold $k_n$ may depend only on the vectors $a_n$ in the vector v of the feature quantity. In this case, the second function g is, for example, a vector value function that satisfies the following equation (8):

$$k=(k_1,k_2, \ldots ,k_N)^T=g(v)=(g_1(a_1),g_2(a_2), \ldots ,g_N(a_N))^T \quad (8)$$

In the equation (8), $a_n$ is a feature quantity representing a change of the n-th sensor to be monitored over time. In the first modification, therefore, the second threshold $k_n$ depends on the feature quantity representing a change of the n-th sensor to be monitored over time and thus does not depend on a feature quantity representing a change of other sensors to be monitored over time. The predicted value $f_n$ of the n-th sensor to be monitored is most strongly affected by the measured value of the n-th sensor to be monitored, not by those of the other sensors to be monitored. The same advantageous effects as those of the first embodiment can thus be obtained from the first modification.

(Second Modification)

In the first embodiment, a function in which a second threshold is set large when the measured value of a sensor to be monitored changes frequently over time, is used as a second function, based on the fact that the squared error $\|f(x)-y\|^{\wedge 2}$ of a predicted value $f(x)$ in the normal state of a system to be monitored is likely to be large at a time when the measured value of the sensor to be monitored changes rapidly. The essential reason why the squared error $\|f(x)-y\|^{\wedge 2}$ is likely to be large is that the number of items of data at times when the measured value changes rapidly is small in the training data. In the second modification, a function that outputs a second threshold with a large value upon receipt of a feature quantity with a low frequency in the distribution of feature quantities calculated from training data that is a set of measured values used to train the trained model f is used as a second function.

In the second modification, $g_n$ that defines a second function g is calculated using, for example, the following equation (9):

$$g_n(v) = \begin{cases} \alpha_n & P(v) \le \tau_n \\ \beta_n & \text{otherwise} \end{cases} \tag{9}$$

In the equation (9), P is the frequency of the feature quantity to be input and is a function that outputs the frequency in the distribution of feature quantities calculated from the training data, upon receipt of the vector v of the feature quantity. P may be a function that calculates a frequency by a simple empirical distribution, a function that calculates a frequency nonparametrically using kernel density estimation, or a function that calculates a frequency parametrically using a mixture Gaussian distribution. In the equation, $\alpha_n$ and $\beta_n$ are positive constants and $\alpha_n$ is larger than $\beta_n$ ($\alpha_n > \beta_n$), and in represents a threshold related to the frequency. The frequency may be expressed as probabilities normalized to values between 0 and 1. In this case, $\alpha_n$ that is larger than $\beta_n$ becomes the output of $g_n(v)$ if a feature quantity with a low frequency is input in the distribution of feature quantities calculated from the training data. Since $k_n$ is equal to $g_n(v)$ ($k_n = g_n(v)$), $a_n$ having a larger value becomes the second threshold $k_n$ if a feature quantity with a low frequency is input in the distribution of feature quantities calculated from the training data.

In addition, the second function g may be, for example, a Gaussian function expressed by the following equation (10).

$$g_n(v) = \theta_n \exp\left(-\frac{P(v)^2}{2\sigma_n^2}\right) \tag{10}$$

In the equation (10), $\theta_n$ and $\sigma_n$ are parameters in which the value of the Gaussian function is positive. Even though the second function shown in the equation (10) is used, a large value becomes the output of $g_n(v)$ if a feature quantity with a low frequency is input in the distribution of feature quantities calculated from the training data. Since $k_n$ is equal to $g_n(v)$ ($k_n = g_n(v)$), a large value becomes the second threshold $k_n$ if a feature quantity with a low frequency is input in the distribution of feature quantities calculated from the training data.

The second modification can be applied to a wider range than the first embodiment. The system of the first embodiment suppresses mis-detection that is caused when the frequency of a feature quantity is lowered as a great change is made in the measured value over time in the distribution of feature quantities calculated from the training data. On the other hand, the system of the second modification can suppress not only mis-detection that is caused when the measured value changes greatly over time, but also mis-detection that is caused when the frequency of a feature quantity is low in the distribution of the feature quantity calculated from the training data. Also, as in the first embodiment, the risk of delay in anomaly detection timing can be minimized by increasing the second threshold.

(Third Modification)

Since $g_n$ is determined using the equation (9) in the second modification, the calculation of P(v) is influenced by the curse of dimensionality if the dimension of the vector v is high. To eliminate the influence, one of the following equations (11) through (14) may be used to determine $g_n$. In this case, the curse of dimensionality can be broken because the dimensionality of a feature quantity regarding a change over time can be decreased. If $a_n$ is a scalar, the calculation of P(v) is even less susceptible to the curse of dimensionality. The third modification is a combination of the first and second modifications. Thus, the same advantageous effects as those of the first and second modifications can be obtained.

$$g_n(v) = \begin{cases} \alpha_n & P(a_n) \le \tau_n \\ \beta_n & \text{otherwise} \end{cases} \tag{11}$$

$$g_n(v) = \begin{cases} \alpha_n & P(\|a_n\|_1) \le \tau_n \\ \beta_n & \text{otherwise} \end{cases} \tag{12}$$

$$g_n(v) = \theta_n \exp\left(-\frac{P(a_n)^2}{2\sigma_n^2}\right) \tag{13}$$

$$g_n(v) = \theta_n \exp\left(-\frac{P(\|a_n\|_1)^2}{2\sigma_n^2}\right) \tag{14}$$

(Fourth Modification)

FIG. 5 is a diagram showing a configuration of an anomaly detection apparatus 100 according to a fourth modification. The anomaly detection apparatus 100 of the fourth modification further includes a display unit 111. Descriptions of configurations, operations and advantageous effects similar to those of the first embodiment are omitted.

In the fourth modification, the feature quantity calculation unit 108 sends a calculated feature quantity to the second threshold setting unit 109 and the display unit 111.

The display unit 111 generates display screen data for displaying a feature quantity trend graph based on a feature quantity, and outputs the generated display screen data to an external display or the like. For example, the display unit 111 generates display screen data for displaying a trend graph showing a change in a feature quantity over time, and displays the trend graph of the feature quantity on an external display or the like. FIG. 6 is a graph showing an example of a feature quantity trend graph. Like FIGS. 3 and 4, FIG. 6 shows a feature quantity of a sensor to be monitored. The horizontal axis of FIG. 6 indicates time that corresponds to the time indicated in FIGS. 3 and 4. The vertical axis of FIG. 6 indicates a feature quantity. FIG. 6 also shows an example in which the differential value of a measured value is used as the feature quantity.

As described above, FIG. 3 shows normal behavior of a measured value and FIG. 4 shows that of a deviation. If, therefore, an anomaly is detected when the deviation in FIG. 4 exceeds the first threshold, the detection is a mis-detection. As can be seen from FIGS. 4 to 6, the absolute value of a differential value, which is a feature quantity, is often large when the deviation exceeds the first threshold. That is, the absolute value of a differential value, which is a feature quantity, is often large when mis-detection is caused.

In the fourth modification, a feature quantity trend graph can be displayed. Even though anomaly is mis-detected when the deviation exceeds the first threshold, the user can check the feature quantity trend graph and notice that the anomaly detection is likely to be mis-detection. In addition to the feature quantity trend graph, a trend graph showing a change in measured value over time and a trend graph showing a change in deviation over time may be displayed on the same screen. In this case, aligning the horizontal axes of time in the trend graphs makes it easier for users to compare the graphs.

(Fifth Modification)

FIG. 7 is a diagram showing a configuration of an anomaly detection apparatus 100 according to a fifth modification. The anomaly detection apparatus 100 of the fifth modification further includes a display unit 112. Descriptions of configurations, operations and advantageous effects similar to those of the first embodiment are omitted.

In the fifth modification, the temporary detection unit 106 sends a calculated deviation to the counter unit 107 and the display unit 112. The feature quantity calculation unit 108 sends the calculated feature quantity to the second threshold setting unit 109 and the display unit 111.

The display unit 112 calculates a correlation coefficient between a deviation or its absolute value and a feature quantity or its absolute value based on the deviation and the feature quantity, generates display screen data for displaying the calculated correlation coefficient, and outputs the generated display screen data to an external display or the like. For example, a correlation coefficient between a deviation $(y_n-f_n)$ or its absolute value and a feature quantity or its absolute value may be displayed on the screen for each sensor to be monitored. If the feature quantity is a vector, no correlation coefficient can be calculated. In this case, for example, a time accumulated value of the feature quantity or the L1 norm of the feature quantity may calculated, the feature quantity, which is not a scalar, into a scalar, may be converted into a scalar, and then a correlation coefficient between the converted feature quantity (scalar) and the deviation $(y_n-f_n)$ or its absolute value may be displayed on the screen.

If the correlation coefficient displayed on the screen is large, the user can quantitatively confirm that the deviation or its absolute value was linked to the feature quantity or its absolute value. If the user can numerically confirm that both of them are linked to each other, he or she can use the system of the first embodiment with confidence to control the second threshold in accordance with the feature quantity.

(Sixth Modification)

FIG. 8 is a diagram showing a configuration of an anomaly detection apparatus 100 according to a sixth modification. The anomaly detection apparatus 100 of the sixth modification further includes a display unit 113. Descriptions of configurations, operations and advantageous effects similar to those of the first embodiment are omitted.

Figure 9:
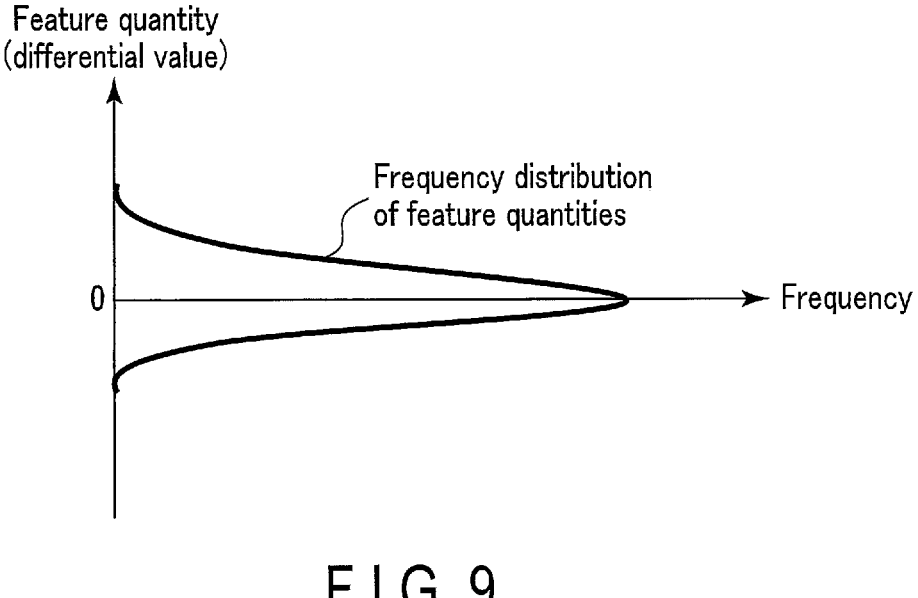
FIG. 9 is a diagram showing an example of the frequency distribution of feature quantities for use in the anomaly detection apparatus according to the sixth modification.

In the sixth modification, the display unit 113 externally acquires the frequency distribution of feature quantities calculated based on training data used for training a trained model, generates display screen data for displaying the acquired frequency distribution, and outputs the generated display screen data to an external display or the like. For example, as the frequency distribution, the frequency $P(v)$ of a feature quantity calculated from the training data or the distribution of $P(a_n)$ may be displayed on the screen. FIG. 9 shows an example in which the frequency $P(a_n)$ of the feature quantity $a_n$ of the n-th sensor to be monitored calculated from the training data is displayed as a frequency distribution. FIG. 9 shows an example in which the differential value of a measured value is used as a feature quantity and $a_n$ is a scalar. The horizontal axis of FIG. 9 represents the frequency. The vertical axis of FIG. 9 represents the feature quantity. The frequency may be expressed as probabilities normalized to values from 0 to 1.

In FIG. 9, the frequency of the feature quantity is high near the feature quantity of 0. Since the differential value is used as a feature quantity, the fact that the feature quantity is near 0 corresponds to a steady state in which the measured value does not change much. Conversely, the fact that the feature quantity is not near 0 corresponds to a transient state in which the measured value changes. FIG. 9 thus means that the measured value of the n-th sensor to be monitored in the training data consists mainly of steady-state data. In FIG. 9, the frequency of the feature quantity related to a change over time is high near 0. If, therefore, the frequency distribution shown in FIG. 9 is displayed, the user can confirm that mis-detection can be suppressed by automatically controlling the second threshold at a time when the measured value of the n-th sensor to be monitored changes rapidly to be larger than the second threshold at other times.

Figure 10:
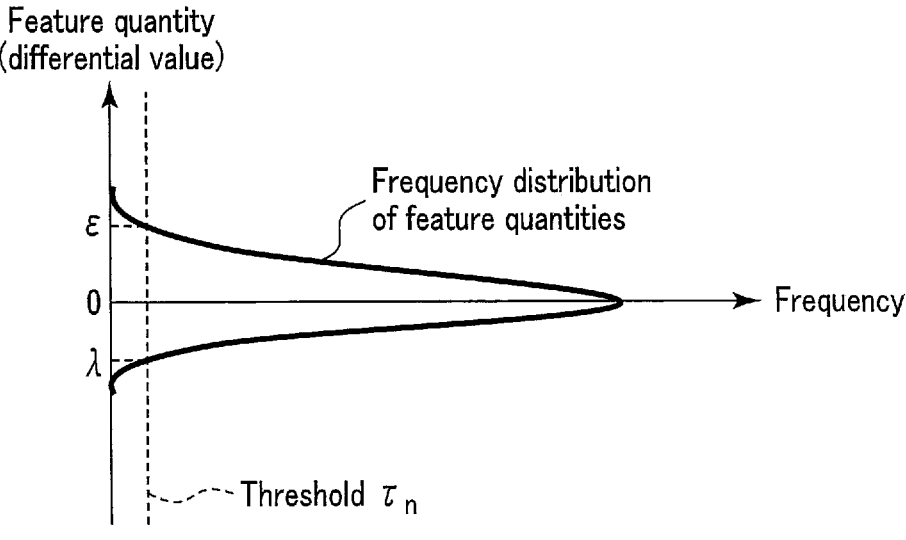
FIG. 10 is a diagram showing an example of superposing a threshold on the frequency distribution in FIG. 9.

In addition to the frequency distribution, a threshold for the frequency may be displayed. FIG. 10 is a diagram showing $a_n$ example in which the threshold value in for the frequency in the equation (11) used in the third modification is superposed on the frequency distribution shown in FIG. 9. It can be seen from FIG. 10 that if the feature quantity is equal to or larger than $\varepsilon$ or equal to smaller than $\lambda$, the frequency of the feature quantity is equal to or smaller than $\tau_n$. If the threshold in related to the frequency is displayed on the frequency distribution, the user can check at a glance the feature quantity in which the second threshold $k_n$ of the n-th sensor to be monitored becomes $\alpha_n$ or $\beta_n$.

(Seventh Modification)

FIG. 11 is a diagram showing a configuration of an anomaly detection apparatus 100 according to a seventh modification. The anomaly detection apparatus 100 of the seventh modification further includes a display unit 114. Descriptions of configurations, operations and advantageous effects similar to those of the first embodiment are omitted.

In the seventh modification, the second threshold setting unit 109 sends a set second threshold to the detection unit 110 and the display unit 114.

The display unit 114 generates display screen data for displaying a second threshold trend graph based on the second threshold, and outputs the generated display screen data to an external display or the like. If, for example, display screen data for displaying a trend graph showing a change in the second threshold over time is generated, and the second threshold trend graph is displayed on an external display or the like. FIG. 12 is an illustration of an example of the second threshold trend graph. FIG. 12(*a*) shows an example of a feature quantity trend graph. FIG. 12(*b*) shows a second threshold trend graph when the feature quantity changed as shown in FIG. 12(*a*). FIG. 12(*b*) shows a trend graph of the second threshold $k_n$ of the n-th sensor to be monitored. FIGS. 12(*a*) and 12(*b*) show a trend graph of the same sensor to be monitored as that of FIGS. 3, 4 and 6. The horizontal axis of FIGS. 12(*a*) and 12(*b*) indicates time, which corresponds to the same time as shown in FIGS. 3, 4 and 6. The vertical axis of FIG. 12(*a*) indicates a feature quantity. The vertical axis of FIG. 12(*b*) indicates a second threshold. FIG. 12(*b*) shows an example in which the feature quantity of training data has the frequency distribution shown in FIG. 10, the equation (11) of the third modification is used, and the second threshold is calculated.

When the feature quantity is equal to or larger than ε or equal to or smaller than λ as shown in FIG. 10, the frequency of the feature quantity becomes equal to or lower than the threshold $\tau_n$. Referring to FIGS. 12(*a*) and 12(*b*), therefore, the second threshold becomes $\alpha_n$ at times when the feature quantity is equal to or larger than ε and equal to or smaller than λ, and the feature quantity is larger than $\beta_n$ that is used as a second threshold at the other times.

In the seventh modification, the trend graph of the second threshold can be displayed. If the user checks the trend graph of the second threshold, he or she can grasp at a glance the second threshold $k_n$ at each time of the n-th sensor to be monitored. In addition to the trend graph of the second threshold, a trend graph showing a change in measured value over time or a trend graph showing a change in deviation over time may be displayed on the same screen. In this case, the user can check at a glance how the second threshold $k_n$ increases with timing when the measured value changes rapidly or when the absolute value of the deviation exceeds the first threshold.

Second Embodiment

In the first embodiment and its modifications, since steady operation dominates in plants such as power plants and water treatment plants and in systems to be monitored which are used for manufacturing equipment, a function in which a second threshold is set large when the measured value changes frequently over time, is used as a second function. The second embodiment is directed to a system to be monitored in which a transient state with a number of changes in measured value over time is dominant. Descriptions of configurations, operations and advantageous effects similar to those of the first embodiment are omitted.

In the second embodiment, too, the second function needs to be a function in which a second threshold is set large to a pattern for which data of a normal pattern cannot sufficiently be prepared as training data used for learning a trained model used as a first function. In the second embodiment, therefore, the second function needs to be a function in which the second threshold is set small when the measured value changes frequently over time and it is set large when the measured value does not change much.

FIG. 13 shows an example in which the frequency P ($a_n$) of the feature quantity $a_n$ of the n-th sensor to be monitored, which is calculated from training data is displayed as a frequency distribution. FIG. 13 is an example in which the differential value of a measured value is used as a feature quantity and $a_n$ is a scalar. The horizontal axis of FIG. 13 represents a frequency. The vertical axis of FIG. 13 represents a feature quantity. The frequency may be expressed as probabilities normalized from 0 to 1.

In FIG. 13, the frequency of feature quantity is high at two points other than the vicinity of 0. Since the feature quantity is a differential value, a positive feature quantity whose frequency is high in FIG. 13 indicates that the measured value of the n-th sensor to be monitored in the training data tends to increase frequently. A negative feature quantity whose frequency is high in FIG. 13 indicates that the measured value of the n-th sensor to be monitored in the training data tends to decrease frequently. The fact that FIG. 13 shows one positive feature quantity and one negative feature quantity as a high-frequent feature quantity indicates that the measured value of the n-th sensor to be monitored in the training data moves up and down frequently and does not change much.

In the second embodiment, the second threshold at a time when the measured value of the n-th sensor to be monitored does not change much is automatically controlled to be larger than the second threshold at other times. Thus, mis-detection due to the low frequency in the training data can be suppressed when the feature quantity is distributed as shown in FIG. 13. Also, in the second embodiment, the second threshold does not increase at a point of time when the feature quantity is not near 0. Thus, even though an anomaly occurs when the frequency of the feature quantity is high, the second threshold is set small, with the result that the anomaly can be detected without delay in detection.

As in the second and third modifications to the first embodiment, in the second embodiment, too, the second threshold can be controlled in accordance with the frequency in the training data to suppress mis-detection due to the low frequency in the training data and prevent the detection timing of an anomaly, which is caused with high frequency timing of the feature quantity in FIG. 13, from being delayed.

As described above, if the second threshold is controlled by calculating the frequency in the distribution of feature quantities calculated from the training data, more mis-detection can be suppressed in both the first and second embodiments.

Like in the first embodiment, in the second embodiment, the frequency distribution may be displayed on an external display or the like. In this case, for example, the frequency distribution shown in FIG. 13 is displayed. In addition to the frequency distribution, a threshold related to the frequency may be displayed. FIG. 14 is a diagram showing an example in which the third modification is applied to the second embodiment and the threshold value $\tau_n$ related to the frequency when the above equation (11) is adopted is superposed on the frequency distribution shown in FIG. 14. If the threshold value $\tau_n$ related to the frequency is displayed on the frequency distribution, the user can check at a glance a feature quantity by which the second threshold $k_n$ of the n-th sensor to be monitored becomes $\alpha a_n$ or $\beta a_n$.

As described above, according to either of the first and second embodiments, an anomaly detection apparatus, a method and a program can be provided which achieves both early detection of an anomaly and suppression of mis-detection.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An anomaly detection apparatus for detecting anomaly in a system comprising a plurality of sensors installed in power plants, water treatment plants, or manufacturing equipment, the anomaly detection apparatus comprising a processing circuit, the processing circuit being configured to:

acquire, via a wired or wireless network, measured values from the plurality of sensors, the measured values including time-series data measured from time to time by each of the plurality of sensors;

acquire a first function to output predicted values of the measured values upon receipt of the measured values, the first function being a trained model generated by machine learning using training data generated from history data of measured values of the plurality of sensors;

acquire a first threshold;

acquire a second function to output a second threshold upon receipt of feature quantities related to a change in the measured values over time, the second function being configured to output a higher value as the second threshold when the feature quantities indicate a rapid change in the measured values and output a lower value as the second threshold when the feature quantities indicate a minimal change;

generate the predicted values based on a measured value acquired at a time for monitoring and the first function;

temporarily detect that a deviation between the measured values and the predicted values exceeds the first threshold to generate a temporary detection signal related to a result of the temporary detection;

count the number of consecutive times of the temporary detection at the time for monitoring based on the temporary detection signal;

calculate the feature quantities based on a change in the measured values over time;

determine a second threshold based on the feature quantities and the second function;

determine whether the number of consecutive times is equal to or larger than the second threshold to detect one of an anomaly of the system to be monitored and a sign of the anomaly;

generate a detection signal related to a result of the detection, the detection signal including a plurality of elements corresponding respectively to the plurality of sensors; and output the detection signal to an external device.

2. The anomaly detection apparatus of claim 1, wherein the feature quantities include a differential value of the measured values, an absolute value of the differential value, a cumulative value of the differential value, and a cumulative value of the absolute value.

3. The anomaly detection apparatus of claim 1, wherein:

the second function outputs a first value as the second threshold upon receipt of a feature quantity with a first frequency and outputs a second value, which is equal to or larger than the first value, as the second threshold upon receipt a feature quantity with a second frequency that is lower than the first frequency, based on frequency distribution of feature quantities calculated based on training data that is a set of measured values used for training the trained model; and the second threshold output from the second function takes two or more different values in accordance with a frequency in the frequency distribution of the feature quantities, which is input to the second function.

4. The anomaly detection apparatus of claim 2, wherein a cumulative period related to the cumulative value is equal to or shorter than a time window length of the measured values input to the first function.

5. The anomaly detection apparatus of claim 1, wherein the processing circuit is configured to:

generate display screen data for displaying a trend graph of the feature quantities; and output the generated display screen data to an external display.

6. The anomaly detection apparatus of claim 1, wherein the processing circuit is configured to:

generate display screen data for displaying a correlation coefficient between the deviation and the feature quantities; and output the generated display screen data to an external display.

7. The anomaly detection apparatus of claim 3, wherein the processing circuit is configured to:

generate display screen data for displaying the frequency distribution; and output the generated display screen data to an external display.

8. The anomaly detection apparatus of claim 1, wherein the processing circuit is configured to:

generate display screen data for displaying a trend graph of the second threshold value; and output the generated display screen data to an external display.

9. A method for detecting anomaly in a system comprising a plurality of sensors installed in power plants, water treatment plants, or manufacturing equipment, the method comprising:

acquiring, by a processing circuit via a wired or wireless network, measured values from the plurality of sensors, the measured values including time-series data measured from time to time by each of the plurality of sensors;

acquiring, by the processing circuit, a first function to output predicted values of the measured values upon receipt of the measured values, the first function being a trained model generated by machine learning using training data generated from history data of measured values of the plurality of sensors;

acquiring, by the processing circuit, a first threshold;

acquiring, by the processing circuit, a second function to output a second threshold upon receipt of feature quantities related to a change in the measured values over time, the second function being configured to output a higher value as the second threshold when the feature quantities indicate a rapid change in the measured values and output a lower value as the second threshold when the feature quantities indicate a minimal change;

generating, by the processing circuit, the predicted values based on the measured values and the first function;

temporarily detecting, by the processing circuit, that a deviation between the measured values and the predicted values exceeds the first threshold to generate a temporary detection signal related to a result of the temporary detection;

counting, by the processing circuit, the number of consecutive times of the temporary detection at a time for monitoring based on the temporary detection signal;

calculating, by the processing circuit, the feature quantities based on a change in the measured values over time;

determining, by the processing circuit, a second threshold based on the feature quantities and the second function;

determining, by the processing circuit, whether the number of consecutive times is equal to or larger than the second threshold to detect one of an anomaly of the system to be monitored and a sign of the anomaly, and generating a detection signal related to a result of the detection, the detection signal including a plurality of elements corresponding respectively to the plurality of sensors; and outputting, by the processing circuit, the detection signal to an external device.

10. A non-transitory computer-readable storage medium storing a program for detecting anomaly in a system comprising a plurality of sensors installed in power plants, water treatment plants, or manufacturing equipment, the program causes a computer to execute:

a function of acquiring, via a wired or wireless network, measured values from the plurality of sensors, the measured values including time-series data measured from time to time by each of the plurality of sensors;

a function of acquiring a first function to output predicted values of the measured values upon receipt of the measured values, the first function being a trained model generated by machine learning using training data generated from history data of measured values of the plurality of sensors;

a function of acquiring a first threshold;

a function of acquiring a second function to output a second threshold upon receipt of feature quantities related to a change in the measured values over time, the second function being configured to output a higher value as the second threshold when the feature quantities indicate a rapid change in the measured values and output a lower value as the second threshold when the feature quantities indicate a minimal change;

a function of generating the predicted values based on the measured values and the first function;

a function of temporarily detecting that a deviation between the measured values and the predicted values exceeds the first threshold to generate a temporary detection signal related to a result of the temporary detection;

a function of counting the number of consecutive times of the temporary detection at a time for monitoring based on the temporary detection signal;

a function of calculating the feature quantities based on a change in the measured values over time;

a function of determining a second threshold based on the feature quantities and the second function;

a function of determining whether the number of consecutive times is equal to or larger than the second threshold to detect one of an anomaly of the system to be monitored and a sign of the anomaly and generating a detection signal related to a result of the detection, the detection signal including a plurality of elements corresponding respectively to the plurality of sensors; and a function of outputting the detection signal to an external device.

* * * * *